3,274,011
CLAY PRODUCTS AND AQUEOUS SYSTEMS CONTAINING SAME
James B. Duke, Metuchen, N.J., assignor to Minerals & Chemicals Philipp Corporation, Menlo Park, N.J., a corporation of Maryland
Filed Oct. 4, 1963, Ser. No. 313,742
6 Claims. (Cl. 106—72)

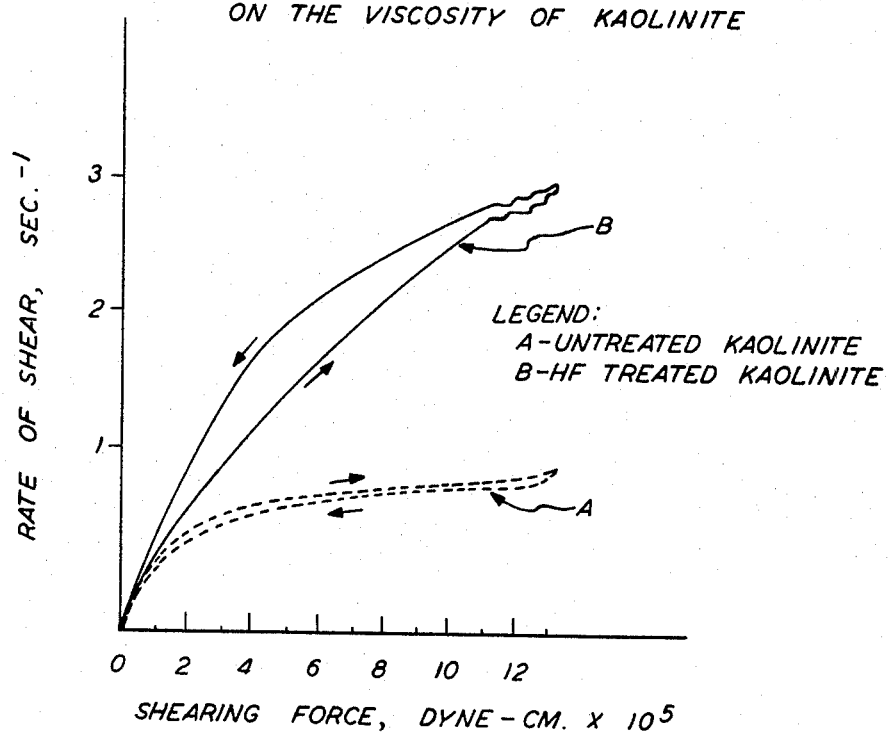

The present invention has to do with kaolin clay and with rheological properties of aqueous dispersions of such clay. The invention relates, more specifically, to a chemical treatment of kaolin clay to alter and to improve rheological properties of concentrated aqueous slips of the clay.

A coating color is a pigmented fluid composition which is applied to paper to produce a desirable surface finish thereon. The coating color consists essentially of water, adhesive, pigment, and pigment dispersing agent (deflocculating agent). One of the most important uses of kaolin clay, especially a minus 2 micron size fraction of the clay, is as the sole or principal pigment ingredient in the coating color.

In former years, the speeds at which paper coating machines applied coating colors to raw stock were rather low and coating colors of fairly low solids content, say 50% to 60%, sufficed. There are extensive deposits of kaolin clays from which there can be obtained a minus 2 micron material which can be made up into aqueous slips that possess the desired rheological properties for former paper coating operations. At present, however, the paper coating industry employs very high machine speeds and, in order to maintain adequate drying rates, considerably more concentrated coating colors are required. In formulating these high solids coating colors the clay is originally made up into a highly concentrated deflocculated slip (typically at 65% to 72% clay solids). Many kaolin clays cannot be made into slips of suitable concentration. Other clays result in high solids slips which are excessively viscous and/or are so dilatant that they cannot be pumped. In other words, the concentrated slips have undesirable high shear flow properties.

A general object of this invention is to provide a novel kaolin clay product.

Another object is the provision of a treated kaolin clay product which is more useful for paper coating use than the untreated clay.

A specific object is to provide a treated kaolin clay product which, when dispersed in water at high clay solids, has a lower viscosity at high rates of shear (as measured by Hagan or Hercules viscometers).

Another object is to reduce the dilatancy of concentrated kaolin clay slurries.

Another object is to provide means for increasing the clay solids that can be formulated into a kaolin clay slip of suitable fluidity.

Still another object is to provide an acid-treated clay product of substantially the same chemical analysis as kaolin clay but having altered flow properties in aqueous media, especially in aqueous solutions of polyphosphate clay dispersing agents.

Further objects and features of this invention will be apparent from a description thereof which follows.

I have discovered that the flow properties of kaolin clay in aqueous media, especially in aqueous solutions of clay dispersing agents, are desirably altered for paper coating use when the clay is treated with an extremely small quantity of hydrofluoric acid and in a manner hereinafter described before the clay is slipped with water containing a clay dispersing agent.

Stated briefly, a kaolin clay product of improved flow properties is provided by agitating a minor weight proportion of kaolin clay in a major weight proportion of a dilute aqueous solution of hydrofluoric acid, and filtering and washing the acid-treated clay. The clay product obtained in this manner is adapted to be "made-down" for paper coating use in conventional manner, i.e., the hydrofluoric acid-treated clay product is agitated in a dilute aqueous solution of clay dispersing agent, such as tetrasodium pyrophosphate clay dispersing agent, and the clay dispersion is diluted with adhesive suspension.

It is also within the scope of the invention to provide a predispersed clay product by incorporating a clay dispersing agent, such as a polyphosphate clay dispersing agent, with a slurry of washed, hydrofluoric acid-treated kaolin and then spray drying the slurry using spray drying techniques known in the art.

An advantage of the treated kaolin clay product of this invention is that slips of higher clay solids content can be prepared with the treated clay than with the untreated clay. To illustrate, when a so-called "high viscosity" kaolin clay was pretreated with hydrofluoric acid, in accordance with this invention, a 65% solids slip of the clay could be readily prepared with tetrasodium pyrophosphate as the clay dispersing agent. With the untreated clay, however, the maximum loading obtained with tetrasodium pyrophosphate dispersing agent was only 48% clay solids. In other words, 17% more clay could be incorporated into the slip when the treated clay product of this invention was used.

Still another and important advantage is that, at a given clay solids level, dispersed concentrated aqueous slips of the treated clay will generally be appreciably more fluid and less dilatant at high shear rates (e.g., shear rates measured by the Hagan viscometer) than slips of the untreated clay.

It was indeed surprising and unexpected to find that an acid material was so effective in bringing about a substantial reduction in high shear viscosity of clay slurries since materials of an alkaline nature, such as sodium hydroxide or ammonium hydroxide find widespread use as clay dispersing agents and fluidize concentrated clay slips. Conversely, it is known in the art that acidic material normally flocculate clay slurries and, therefore, make the slurries more viscous. The beneficial effect of the hydrofluoric acid pretreatment on high shear flow properties of dispersed slips of the clay was especially surprising in view of the suggestion in U.S. Patent No. 2,995,458 to H. H. Murray to add lithium hydroxide to a dispersed kaolin slip for generally the same purpose as the acid pretreatment of the subject invention.

To realize the desirable effects of the hydrofluoric acid treatment on the kaolin clay, it is essential to employ the acid as a pretreatment of a dilute clay slip before the clay is filtered, washed and ultimately slipped at high solids with a clay dispersing agent. The mere incorporative of hydrofluoric acid into a high solids clay slip containing clay dispersing agent increases the high shear viscosity of the slip. In other words, the acid has an opposite effect on high solids flow properties of deflocculated clay slips when employed as a pretreatment, in accordance with this invention. Another essential feature appears to reside in contacting the clay with the hydrofluoric acid while the clay is in contact with an abundance of liquid water. The desired results are not obtained when dry clay or clay that has been merely moistened is contacted with concentrated hydrofluoric acid. Still another essential feature resides in the use of fluoride ion in the form of hydrofluoric acid. Thus, the high shear flow properties of kaolin clay are not improved when a fluoride salt, such as sodium or potassium fluoride, is substituted for hydrofluoric acid as the clay treating agent. This result was surprising in light of the prior art teaching of the effectiveness of potassium fluoride as an agent to deflocculate dilute slips of kaolin clay (J. Am. Ceram. Soc. 34, 242–4 (1951)).

More specifically, in putting this invention into practice a naturally occurring clay consisting predominantly of the clay mineral kaolinite is employed. Kaolinite is a hydrated aluminum silicate of the empirical formula $Al_2O_3 \cdot 2SiO_2 \cdot 2H_2O$. Substantially pure kaolinite, free from bentonitic clay, is recommended since the presence of any bentonite can have a markedly adverse effect on the end product. On the other hand, small amounts of micaceous mineral impurities such as occur in English clays may not be detrimental. The starting clay can be whole clay (which usually has an average equivalent spherical diameter of about 0.8 to 2 microns) or it can be a fine size fraction of whole clay, e.g., a clay having an average equivalent spherical diameter of 0.5 to 0.8 micron.

The hydrofluoric acid can be incorporated with the aqueous slip of kaolin clay either by slipping the dry clay in a solution of hydrofluoric acid of suitable concentration or by incorporating the hydrofluoric acid, especially an aqueous solution of the acid, into a previously formed clay slip. Preliminary results indicate that somewhat better results can be realized with the former technique. Excellent results have been obtained when the concentration of clay in the slip was within the range of about 20% to about 30% at the time the slip was agitated with the hydrofluoric acid and when the acid was employed in amount of about 20 pounds of HF (100% acid basis) per ton of clay, on a moisture free clay weight basis. (Moisture free clay weight is the weight of the clay after the clay is heated to essentially constant weight at 225° F.) Under these conditions, it can be seen that the initial concentration of the hydrofluoric acid solution was within the range of about 0.25% to 0.30%. However, the invention is not limited to the use of 20 pounds HF per ton of clay or to the use of hydrofluoric acid of 0.25% to 0.30% concentration since satisfactory results can be expected with as much as about 40 pounds HF per ton of clay or as little as about 5 to 10 pounds HF per ton of clay. Generally speaking, initial acid concentration should be less than 1%.

Excellent results have been obtained when the clay was agitated in the dilute hydrofluoric acid solution at ambient temperature. The agitation time does not appear to be especially critical. While short agitation periods can be used, it is believed that prolonged intense agitation may be of benefit. Agitation at ambient temperature for a period within the range of 15 minutes to 24 hours is recommended. The vessel and agitating equipment should be made of material that is resistant to attack with hydrofluoric acid. A propeller-type agitator with a polyethylene shaft and propeller is suitable.

When the clay starting material is predispersed clay (clay containing clay dispersing agent such as sodium polyphosphate salt) or when the slip of starting clay contains clay dispersing agent, it is obvious that when hydrofluoric acid is added it will initially neutralize the dispersing agent. Therefore, under these circumstances the quantity of hydrofluoric acid incorporated in the clay slip must be increased to compensate for consumption of some of the acid by the dispersing agent.

After the clay has been agitated with the dilute acid solution for a suitable period of time, free acid should be washed from the clay. This can be done by filtering the fluoridated slip of clay and washing the filter cake with water until the pH of a slurry of the clay is at a value substantially normal for kaolin clay (typical a pH of about 4.5). The dried filter cake can be used as such in preparing the make-down, or it can be pulverized for use in the make-down. Also, it is within the scope of the invention to slip the washed filter cake without a drying step and use this slip in the make-down.

The clay product is adapted for making slips containing 50% to 72% clay solids, especially slips containing 65% to 70% clay solids. The dispersing agents used in forming these slips can be any of the usual sodium polyphosphate clay dispersing agents, e.g., tetrasodium pyrophosphate, sodium hexametaphosphate, sodium tetraphosphate or sodium silicate. The dispersing agent is usually employed in amount within the range of from about 0.1% to 0.5% of the clay weight. Preliminary experiments indicate that optimum results are realized when the quantity of clay dispersing agent is somewhat less than would be employed for optimum results with untreated clay. If desired, sodium hydroxide or ammonium hydroxide can be incorporated in the make-down to adjust pH.

This invention will be more fully understood by the following examples wherein all viscosity measurements, unless otherwise indicated, were made on a Hagan viscometer. In the Hagan instrument, the torque-r.p.m. curve is recorded on a circular graph. In this graph, bob speed is represented as a percentage of maximum bob speed and is recorded by figures around the outside circumference of the graph. Torque, which is represented on the graph as a percentage of maximum torque, is recorded radially on the circular graph. Absolute values of rate of shear in sec.$^{-1}$ are calculated by multiplying the percent of maximum speed by 108. Absolute values of torque (shearing force) in dyne-cm. are calculated for the medium bob and medium torque linkage by multiplying the percentage of maximum torque recorded on the Hagan rheogram by $1.25 \times 10^4$. Apparent viscosity in poises can be obtained by dividing the shearing force per unit area by the rate of shear. Since the apparent viscosity is inversely proportional to rate of shear at a given shearing force (torque), a fluid of highest apparent viscosity is indicated by a rate of shear-stress curve with maximum shearing force at a minimum rate of shear.

The prepared sample was placed in the cup of the Hagan instrument and the bob lowered into the sample. The machine was turned on and the hand crank which activates the transmission was turned at a speed of 1 r.p.m. until either 100% torque or a speed 80% of scale (the maximum speed obtainable with the Hagan instrument) was reached. The downcurve of the rheogram was then obtained by operating the hand crank in the same manner employed in obtaining the upcurve. A circular rheogram recording variation of torque with rate of shear (as indicated by bob speed) was automatically traced out.

*Example 1*

The clay starting material was a water-washed, degritted zinc hydrosulfite bleached kaolinite from a deposit near McIntyre, Georgia. Following is a chemical analysis and a summary of properties of the clay:

| | Wt. percent [1] |
|---|---|
| $SiO_2$ | 51.36 |
| $Al_2O_3$ | 45.62 |
| $Fe_2O_3$ | 0.38 |
| $TiO_2$ | 2.02 |
| CaO | 0.07 |
| MgO | 0.05 |
| $K_2+Na_2O$ | 0.12 |
| Total volatile free material | 99.62 |
| L.O.I. ("as is" basis), percent | 14.26 |
| Free moisture (det. at 225° F.), percent | 0.62 |
| Base-exchange capacity, meq./100 gm. | 3.9 |
| Surface area (B.E.T. method), m.$^2$/g. | 12.3 |
| Apparent viscosity (Hagan), poises at 1530 sec.$^{-1}$ | >18.7 |
| Average particle size, microns (equivalent spherical diameter) | 1.0 |

[1] Reported on a volatile free (V.F.) clay weight basis—determined by heating clay to constant weight at 1800° F.

The clay was treated with 20 pounds HF per ton of clay at an acid concentration of 0.25% in the following manner. One gram of hydrofluoric acid (as a 10% aqueous solution) was added to 400 grams of water in a 600 milliliter polyethylene beaker. One hundred grams of dry kaolinite were slowly added to the solution with continuous mechanical stirring. The slurry was mixed at high speed for 30 minutes at room temperature with a Talboy stirrer. The slurry was filtered through a Buchner funnel and washed twice with 600 milliliter portions of distilled water. The filter cake was then dried at 220° F.

A 70% solids clay slurry was made up with the hydrofluoric acid-treated kaolin clay. A control 70% solids slurry was made up with the clay without the hydrofluoric acid treatment. All slurries were made by adding the following solutions to clay samples in the order given: distilled water; 1 N solution of $Na_6P_4O_{13}$ (polyphosphate clay dispersing agent) in amount of 0.3%, based on the dry clay weight; and 1 N NaOH to bring the pH to 7.0, as measured with a pH meter. The dispersed slip was then brought to 70% ±0.2% solids on a Cenco Moisture Balance by addition of an appropriate amount of distilled water.

Hagan circular rheograms were obtained for each of the slurries. Shearing stress-rate of strain curves were made by converting values on the Hagan circular chart to rectilinear coordinates. These curves appear in the accompanying figure. The first curve, Curve A, is a shearing stress-rate of strain curve of a 70% slip of the starting clay. Curve B represents a shearing stress-rate of strain curve of a 70% slip of the clay which had been previously treated with hydrofluoric acid in accordance with this invention.

A comparison of the slopes of the two curves shows that the slip made with the hydrofluoric acid-treated kaolin clay of this invention was less dilatant than the slip made with untreated clay.

A comparison of rate of shear at shearing forces from about $1 \times 10^5$ dyne-cm. up to a maximum shearing force of about $12.5 \times 10^5$ dyne-cm. shows that for any shearing force within this range the slip of hydrofluoric acid processed kaolin clay required a higher rate of shear. This was especially true when shearing force exceeded about $4 \times 10^5$ dyne-cm. In other words, the slip of hydrofluoric acid-treated kaolin clay was less viscous at high rates of shear.

*Example II*

This example illustrates the increase in clay solids that can be realized by using the hydrofluoric acid-treated kaolin clay of this invention.

Forty-two milliliters of a 0.35% aqueous solution of tetrasodium pyrophosphate was charged to a 250 milliliter plastic beaker. A sample of minus 325 mesh high viscosity Georgia kaolin clay was slowly added to the beaker while the contents were agitated with a propeller-type agitator. When 48 grams of the clay had been added, the mixture became very heavy and dilatant. To determine whether the system could be thinned by further addition of clay dispersing agent, 0.015 gram of tetrasodium pyrophosphate was added. The additional dispersing agent did not reduce the consistency of the clay slip. Thus, with this particular kaolin clay, the highest clay solids slip that could be formulated contained only 53.3% clay solids.

A sample of the high viscosity kaolinite was treated with hydrofluoric acid in the following manner. 200 grams of dry clay was added to 477 milliliters of distilled water in a polyethylene beaker and 40 milliliters of a 5% aqueous solution of hydrofluoric acid was added. The slurry was then vacuum filtered, washed with water, air dried and then dried at 225° F. in an oven overnight. The dried clay was ground to minus 325 mesh. It was found that a 58.8% clay solids slurry could be prepared when the hydrofluoric acid-treated kaolin was used. In effect, by pretreating the kaolinite with hydrofluoric acid, in accordance with this invention, the kaolin could be made-down at a 10% increase in clay solids.

*Example III*

In accordance with this invention, 200 grams of a high viscosity kaolinite material was added to 477 milliliters of distilled water. The clay material had been obtained by sand grinding a sample of degritted Georgia kaolin clay by the procedure described in U.S. Patent No. 3,097,801 to James B. Duke. The mixture was agitated in a plastic beaker to form a smooth slurry and 40 milliliters of a 5% aqueous solution of hydrofluoric acid was added and stirred with a mechanical agitator (plastic shaft and impeller) for 30 minutes. The slurry was vacuum filtered, washed with water and dried in an oven at 195° F. for 1½ hours. The cake was pulverized in a high speed hammer mill (Mikropulverizer).

Seventy percent solids slips were prepared with samples of the sand-ground clay before and after hydrofluoric acid treatment. These slips were formulated with tetrasodium pyrophosphate as the dispersing agent. It was found that the slurry made with hydrofluoric acid-treated, sand-ground kaolinite was less dilatant than the slurry made with the untreated ground kaolinite.

*Example IV*

Still in accordance with this invention, a highly viscous 70% solids clay slurry containing about 0.35% tetrasodium pyrophosphate clay dispersing agent was diluted with water to 30% solids. A 5% aqueous solution of hydrofluoric acid was added to the slurry in a plastic container in amount of 2 parts of 100% HF to 100 parts dry clay. The slurry was agitated with a plastic stirring equipment for 30 minutes, vacuum filtered, washed and the cake air dried at 175° F. overnight. The air-dried cake was disintegrated. A readily flowable 70% solids slurry was obtained by agitating the hydrofluoric acid-treated clay in a 0.35% aqueous solution of tetrasodium pyrophosphate.

I am aware that it has been suggested to treat various clays with fluorides, including hydrofluoric acid. To the best of my knowledge, however, hydrofluoric acid treatment has been limited to the processing of montmorillonite clays, such as bentonite clays, and the resulting clay products have been employed as active contact masses, such as decoloring agents or catalyst. As examples of patents having to do with such treatment of clays with hydrofluoric acid can be mentioned U.S. 2,903,434 to Gunter H. Gloss, U.S. 2,504,618 to Raymond C. Archibald et al. and U.S. 2,450,316 to Alexis Voorhies, Jr. et al.

I claim:
1. A method for reducing the high shear viscosity of kaolinite which consists essentially of:
   forming a slurry consisting essentially of a kaolinite and an aqueous solution of hydrofluoric acid having a concentration less than 1 percent, said slurry containing about 5 to 40 pounds HF per ton of said kaolinite,
   agitating said slurry,
   separating the kaolinite from the aqueous phase and washing the kaolinite to eliminate free acid.
2. The treated kaolinite product of claim 1.
3. A clay slip of reduced viscosity at high shear rates and comprising water, the treated clay product of claim 1 in amount within the range of about 65 percent to 72 percent by weight and a sodium polyphosphate dispersing agent in amount within the range of from about 0.1 percent to 0.5 percent of the clay weight.
4. A clay slip consisting essentially of water, from about 65 percent to 72 percent by weight of the treated clay product of claim 1, and a sodium polyphosphate dispersing agent in amount within the range of from about 0.1 percent to 0.5 percent of the clay weight.

5. The method of claim 1 wherein said slurry of kaolinite and aqueous solution of hydrofluoric acid contains about 20 percent to about 30 percent by weight kaolinite and is agitated for a time within the range of 15 minutes to 24 hours at ambient temperature.

6. The method of claim 5 wherein the kaolinite that is employed is high purity Georgia kaolin clay and the concentration of said hydrofluoric acid is less than 1 percent when said kaolinite is agitated therewith.

References Cited by the Examiner

UNITED STATES PATENTS 2,440,601    4/1948    Dickerman _____ 106—288

FOREIGN PATENTS 272,976    6/1927    Great Britain.

TOBIAS E. LEVOW, Primary Examiner.

J. E. POER, Assistant Examiner.